United States Patent
Brückmann et al.

(10) Patent No.: US 8,432,815 B2
(45) Date of Patent: Apr. 30, 2013

(54) OPTIMIZATION OF THE DATA THROUGHPUT OF A MOBILE RADIO CONNECTION BY EFFICIENT PACKET TYPE CHANGING

(75) Inventors: Dieter Brückmann, Meerbusch (DE); Britta Felbecker, München (DE); Roland Hellfajer, Bochum (DE); Alexander Uwah, Mülheim (DE)

(73) Assignee: Intel Mobile Communications GmbH, Nuebiberg (DE)

( * ) Notice: Subject to any disclaimer, the term of this patent is extended or adjusted under 35 U.S.C. 154(b) by 1238 days.

(21) Appl. No.: 10/915,630

(22) Filed: Aug. 10, 2004

(65) Prior Publication Data
US 2005/0111485 A1  May 26, 2005

(30) Foreign Application Priority Data
Aug. 12, 2003  (DE) .................................. 103 37 067

(51) Int. Cl.
  *H04L 12/26*  (2006.01)
(52) U.S. Cl.
  USPC .......................................................... 370/252
(58) Field of Classification Search .................. 370/252, 370/333, 465, 229, 230, 231, 235
See application file for complete search history.

(56) References Cited

U.S. PATENT DOCUMENTS

| | | | | |
|---|---|---|---|---|
| 6,993,041 B2* | 1/2006 | Yamamoto | | 370/413 |
| 7,062,687 B1* | 6/2006 | Gfeller et al. | | 714/704 |
| 7,369,565 B2* | 5/2008 | Lee et al. | | 370/412 |
| 7,414,991 B2* | 8/2008 | Emerson et al. | | 370/330 |
| 2002/0174362 A1* | 11/2002 | Ullmann et al. | | 713/201 |
| 2003/0108010 A1* | 6/2003 | Kim et al. | | 370/333 |
| 2004/0240391 A1* | 12/2004 | Beckmoller et al. | | 370/252 |

FOREIGN PATENT DOCUMENTS
EP   1 320 210 A2   6/2003

OTHER PUBLICATIONS
"Negotiate Your Way to Interference-Free Bluetooth", David McCall, Communication Systems Design, Jul. 2002, 4 pgs.

\* cited by examiner

*Primary Examiner* — Michael Thier
*Assistant Examiner* — Feben M Haile
(74) *Attorney, Agent, or Firm* — Eschweiler & Associates, LLC

(57) ABSTRACT

A packet-oriented mobile radio transmission system takes account of a packet utilization level that indicates how much of the maximum amount of payload information that can be transmitted is used for transmission. Such packet utilization level is a function of the packet type. A packet type that is suitable in the respective reception conditions is selected at the receiving end as a function of a variable that is characteristic of the integrity of the received data, and of the packet utilization level. At the transmission end, the packet type is switched as a function of the selection result.

18 Claims, 4 Drawing Sheets

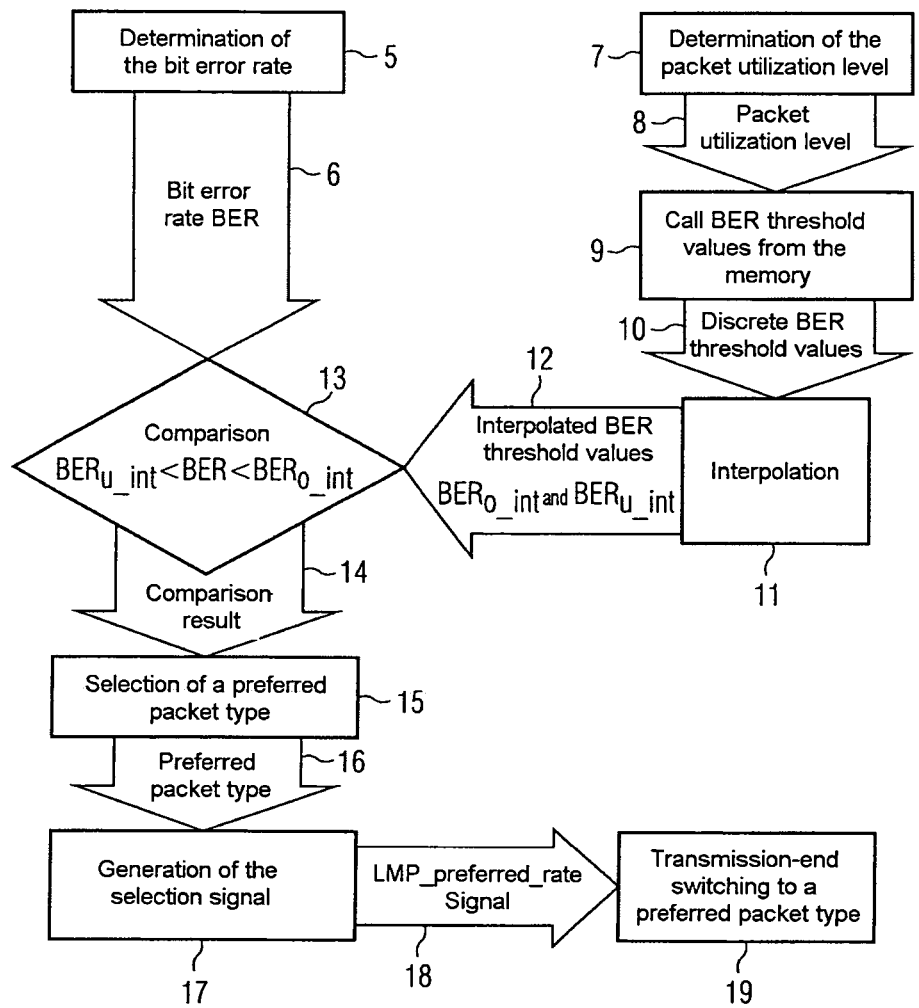

FIG 4A

| Present packet type | Change to a packet type with the next smaller amount of information | | Change to a packet type with the next larger amount of information | |
|---|---|---|---|---|
| | BER | PER | BER | PER |
| DHX | | $PER\_1_{100\%} = 3.4 \cdot 10^{-1}$ | | |
| DM5 | $BER\_2_{100\%} = 3.6 \cdot 10^{-3}$ | | $BER\_1_{100\%} = 1.5 \cdot 10^{-4}$ | |
| DM3 | $BER\_3_{100\%} = 1.0 \cdot 10^{-2}$ | | $BER\_2_{100\%} = 3.6 \cdot 10^{-3}$ | |
| DM1 | | | $BER\_3_{100\%} = 1.0 \cdot 10^{-2}$ | |

FIG 4B

| Present packet type | Change to a packet type with the next smaller amount of information | | Change to a packet type with the next larger amount of information | |
|---|---|---|---|---|
| | BER | PER | BER | PER |
| DHX | | $PER\_1_{75\%} = 3.4 \cdot 10^{-1}$ | | |
| DM5 | $BER\_2_{75\%} = 4.1 \cdot 10^{-3}$ | | $BER\_1_{75\%} = 2.0 \cdot 10^{-4}$ | |
| DM3 | $BER\_3_{75\%} = 1.2 \cdot 10^{-2}$ | | $BER\_2_{75\%} = 4.1 \cdot 10^{-3}$ | |
| DM1 | | | $BER\_3_{75\%} = 1.2 \cdot 10^{-2}$ | |

FIG 4C

| Present packet type | Change to a packet type with the next smaller amount of information | | Change to a packet type with the next larger amount of information | |
|---|---|---|---|---|
| | BER | PER | BER | PER |
| DHX | | $PER\_1_{50\%} = 3.4 \cdot 10^{-1}$ | | |
| DM5 | $BER\_2_{50\%} = 5.1 \cdot 10^{-3}$ | | $BER\_1_{50\%} = 3.1 \cdot 10^{-4}$ | |
| DM3 | $BER\_3_{50\%} = 1.5 \cdot 10^{-2}$ | | $BER\_2_{50\%} = 5.1 \cdot 10^{-3}$ | |
| DM1 | | | $BER\_3_{50\%} = 1.5 \cdot 10^{-2}$ | |

FIG 4D

| Present packet type | Change to a packet type with the next smaller amount of information | | Change to a packet type with the next larger amount of information | |
|---|---|---|---|---|
| | BER | PER | BER | PER |
| DHX | | $PER\_1_{25\%} = 3.4 \cdot 10^{-1}$ | | |
| DM5 | $BER\_2_{25\%} = 7.4 \cdot 10^{-3}$ | | $BER\_1_{25\%} = 5.9 \cdot 10^{-4}$ | |
| DM3 | $BER\_3_{25\%} = 2.2 \cdot 10^{-2}$ | | $BER\_2_{25\%} = 7.4 \cdot 10^{-3}$ | |
| DM1 | | | $BER\_3_{25\%} = 2.2 \cdot 10^{-2}$ | |

OPTIMIZATION OF THE DATA THROUGHPUT OF A MOBILE RADIO CONNECTION BY EFFICIENT PACKET TYPE CHANGING

REFERENCE TO RELATED APPLICATIONS

This application claims the benefit of the priority date of German application DE 103 37 067.6, filed on Aug. 12, 2003, the contents of which are herein incorporated by reference in their entirety.

FIELD OF THE INVENTION

The invention relates to a method for optimization of the effective data throughput in a packet-oriented mobile radio transmission system with different packet types.

BACKGROUND OF THE INVENTION

Present-day mobile radio systems frequently operate on a packet-oriented basis. In this case, the information to be transmitted is subdivided into individual data packets. In the case of the Bluetooth Standard, which operates on a packet-oriented basis, data packets of different types and lengths are interchanged. In the case of asynchronous data traffic, a distinction can be drawn between two classes of packet types in the Bluetooth Standard. The first class of packet types comprises so-called DM packets. These have error protection by means of an FEC code (Forward Error Correction). When transmission errors occur, it is thus possible to identify errors at the receiving end, and if appropriate to correct them. In addition, the use of packet error checksums—as described below—is also envisaged.

As a second class of packet types, DH packet types have no FEC-based error protection. They in each case only have a packet error checksum at the end of the transmitted packet, from which the integrity of the received packet can be deduced at the receiving end. If a packet has errors, the receiver is requested to repeat the packet with errors. The repetition of the packet with errors is also provided for DM packet types, if complete error correction is not possible.

Furthermore, packets may also occupy two or more time slots. In the case of the Bluetooth Standard, one packet may cover one, three or five time slots. The corresponding packet types are called DM1, DM3 or DM5, respectively, for packet types with error protection coding, or DH1, DH3 and DH5, respectively, for packet types without error protection coding. A packet is in this case always transmitted on a single carrier frequency.

Finally, the Bluetooth Standard provides for the number of bits of payload information in a packet to be variable, and not to be governed exclusively by the number of time slots of the packet. The number of bits of payload information may vary between zero and a maximum number of bits that is dependent on the packet type, corresponding to a packet utilization level of 0% to 100%.

In order to optimize the data throughput of a Bluetooth connection between a transmitting appliance A and a receiving appliance B, the appliance B can determine the optimum packet type for the appliance A to use for sending the data. To do this, the appliance B has to make a statement, on the basis of measurements, about the quality of the received data, and use this to decide whether it is worthwhile changing the packet type, in terms of the coding or the number of time slots that are used. This method is referred to as CQDDR (channel quality driven data rate change), and is used in Bluetooth radio interfaces.

It is already known from the article "Negotiate Your Way to Interference-Free Bluetooth" by David McCall, from the specialist journal "Communication System Design", July 2002 issue, pages 28 to 33, for a packet type to be selected on the basis of the bit error rate measured in the receiver when using CQDDR. Since, however, as the second class of packet types, DH packet types do not have any error protection coding, the measurement of the bit error rate is complex in this case. As an alternative, this article proposes that the selection of the suitable packet type be controlled on the basis of the ratio of confirmed or error-free packets (acknowledged packets—ACK) to unconfirmed packets (not acknowledged packets—NACK) or packets with errors. A method such as this has the disadvantage that it does not operate optimally, since the characteristics of the packets are ignored. Furthermore, long measurement time periods are required in order to obtain statistically significant statements about the packet error probability.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention is directed to a method for selection of suitable packet types, with the aim of increasing the effective data throughput in a packet-oriented mobile radio transmission system. In particular, the method is intended to be highly accurate and to respond well to changing channel conditions.

The method according to the invention for optimization of the effective data throughput in a packet-oriented mobile radio transmission system with different packet types is based on taking account of a packet utilization level. The packet utilization level indicates how much of the maximum amount of payload information can be transmitted, and is dependent on the packet type is used for the transmission. In this case, the method according to the invention is subdivided into the following actions:

a) in a first act, a value is determined for at least one variable, which is characteristic of the integrity of the received data, for a present packet type. This value may relate to the received data in a packet, or else to two or more packets, or to a part of one or more packets.

b) In a second act, a value is determined for the packet utilization level for one or more packets of the present packet type.

c) In a further act, a suitable packet type is determined as a function of the at least one variable which is characteristic of the integrity of the received data, and of the packet utilization level.

The method according to the invention has the advantage that taking account of packet-specific information in the form of the packet utilization level optimizes the selection of the packet type, and thus the effective data throughput. By additionally taking account of the packet utilization level, it is possible in this case to optimally interpret and utilize the variable which is characteristic of the integrity of the received data, for the purposes of packet type selection.

It is advantageous for the action c) to be subdivided into the following actions:
c1) Compare the value which was determined in act a) for the at least one variable which is characteristic of the integrity of the received data with at least one threshold value, which is dependent on the packet utilization level.
c2) A suitable packet type is then selected as a function of the comparison in act c1).

This offers the advantage that the comparison of the variable which is characteristic of the integrity of the received data with a switching threshold that is dependent on the packet utilization level allows a different assessment of the same variable, depending on the packet utilization level, for the selection of an optimum packet type.

It is advantageous if the packet utilization level is defined by the ratio of an actual number of bits of payload information to a maximum possible number of bits (which is dependent on the packet type) of payload information in one or more packets.

This allows the packet utilization level to be determined in a simple manner. This may be related either to only one packet or else, as a mean value, to two or more packets.

The variable that is characteristic of the integrity of the received data advantageously describes the integrity of sub-units of a packet. In this case, it is advantageous if the variable that is characteristic of the integrity of the received data is the bit error rate.

For optimization of the effective data throughput, it is advantageous to keep the number of transmission repetitions caused by non-confirmed packets or packets with errors as low as possible, since transmission repetitions require a portion of the transmission bandwidth of the transmission channel, so that the effective data throughput for a packet type decreases in comparison to the maximum data throughput for the same packet type which can be achieved without transmission repetition.

If the bit error rate is used for determination of the quality of the received data in a CQDDR-based system, then, if the packet utilization levels differ, it is not possible to use only this bit error rate to determine the probability with which a packet cannot be corrected and thus contains errors. If, by way of example, a packet has only a low packet utilization level—that is to say a small number of transmitted bits in comparison to the maximum number of bits for this packet type—then the probability of a transmission repetition is lower than in the case of a packet with a high packet utilization level with the same bit error rate. This is because, if the packet utilization level is high, then, in absolute terms, more bits are transmitted in each packet than when the packet utilization level is low, so that, for the same bit error probability, that is to say the probability of a bit error in each bit, more bits may be erroneous and it may not be possible to correct them, so that, in consequence, a transmission repetition is required more frequently. By taking account of bit error rate threshold values that are dependent on the packet utilization level, according to the invention, it is thus possible to select the optimum packet type that has a low probability of a transmission repetition, so that the effective data throughput is maximized.

In general, a transmission system that is optimized for a high effective data throughput should have a packet error rate which is as low as possible. In this case, the packet error rate is defined as the quotient of the number of packets containing errors divided by the total number of packets received. Consideration of bit error rate threshold values that are dependent on the packet utilization level, according to the invention, thus takes account of the fact that the relationship between the packet error rate, which should be kept low for the selection of the suitable packet type, and the bit error rate is dependent on the packet utilization level. It is thus not possible to use the bit error rate on its own to deduce the present packet error rate as a variable governing the effective data throughput.

Furthermore, it should be noted that, if the number of bits carrying information in each packet is reduced by means of a reduced packet utilization level, the probability of error-free transmission of the packet is increased just by the fact that drifting of transmission-critical parameters (for example the phase offset of the detector, the carrier frequency offset of the modulator/demodulator or the channel model parameter) over time during the transmission of the packet becomes increasingly less important. In some circumstances in this case, the drifting of the parameters results in the bit errors increasing sharply at the end of the packet, where so-called error bursts occur which can no longer be corrected. The probability of an error burst and of the erroneous transmission of a packet associated with this in this case increases as the packet utilization level increases. It should not be assumed that the bit error rate, as an averaged variable, reflects the increase in the error burst probability at the end of the packet, for example over the duration of a packet, to an adequate extent, for example over the duration of a packet, since the bit error rate, as an absolute variable, contains no information about the distribution of the bit errors over the packet. This effect that is caused by the drifting of transmission-critical parameters over time can be counteracted by the consideration of bit error rate threshold values that are dependent on the packet utilization level, according to the invention.

Furthermore, the use of the bit error rate generally offers the advantage over direct measurement of the packet error rate that the same number of measurement points are available within a shorter measurement period, or a greater number of measurement points are available within the same measurement period. The required measurement period can thus be considerably shortened for the same measurement accuracy, or the measurement accuracy can be considerably increased for the same measurement period.

It is advantageous for the packet types to be coded using a forward error correction code (FEC Code). This offers the advantage that the bit error rate can be determined easily with the aid of the redundancy that is added by the coding. The added redundancy in the case of FEC codes is in this case designed such that a specific number of errors can be corrected in the receiver. This information can also be used to detect individual bit errors, in order to determine a bit error rate.

One or more threshold values is or are advantageously in each case allocated to each of two or more discrete packet utilization levels. These threshold values are in stored form in the mobile radio transmission system.

It can easily be seen that the relationship between the bit error rate and the packet error rate, which is a target variable for the optimization of the effective data throughput, is not linear for a fixed packet utilization level. In this case, in particular, the coding which is used has an influence on this relationship since the packets in which errors have already been corrected are taken into account in the determination of the packet error rate. The determination of the threshold values for the bit error rate as a function of the packet utilization level is correspondingly complex and computation-intensive. The above measure means that the threshold values are in fact calculated in advance, so that there is no need to calculate them during operation.

In this case, it is advantageous for a threshold value to be determined for any given packet utilization level by interpolation, in particular linear interpolation, from two or more stored threshold values. This offers the advantage that only a small number of threshold values which are dependent on the packet utilization level need be stored in the memory, but that the method operates sufficiently precisely.

Furthermore, the threshold value in act c1) is advantageously dependent on the present packet type. This measure takes account of the fact that the relationship between the bit error rate and the packet error rate is dependent on the packet type, for example in the case of different packet lengths or different codings.

In this case, it is advantageous for one or more respective threshold values to be associated with each of the packet types, and for the threshold values to be stored in the mobile radio transmission system. This means that there is no need to calculate the threshold values during operation.

In one advantageous embodiment, the bit error rate in act c1) is compared with a first and a second threshold value, with the first threshold value being higher than the second threshold value. In this case, it is advantageous to use the following selection rule for the selection process in act c2): a packet type with a next smaller amount of effective information than the present packet type is selected if the bit error rate is higher than the first threshold value. In contrast, a packet type with the next larger amount of effective information than the present packet type is selected if the bit error rate is lower than the second threshold value. In this case, it is advantageous if a packet type with a smaller amount of effective information than a packet type with a larger amount of effective information has a shorter time duration and/or a lower coding rate.

This measure makes it possible to switch between the packet types in a simple manner. All that is done is to switch from a present packet type to the packet type with the next higher or next smaller amount of effective information.

BRIEF DESCRIPTION OF THE DRAWINGS

The invention will be explained in more detail in the following text using an exemplary embodiment and with reference to the drawings, in which:

FIG. 3 shows a flowchart for selection of the suitable packet type;

FIG. 4*a* shows a table of the threshold values for a packet utilization level of 100%;

FIG. 4*b* shows a table of the threshold values for a packet utilization level of 75%;

FIG. 4*c* shows a table of the threshold values for a packet utilization level of 50%; and FIG. 4*d* shows a table of the threshold values for a packet utilization level of 25%.

DETAILED DESCRIPTION OF THE INVENTION

Figure 1:
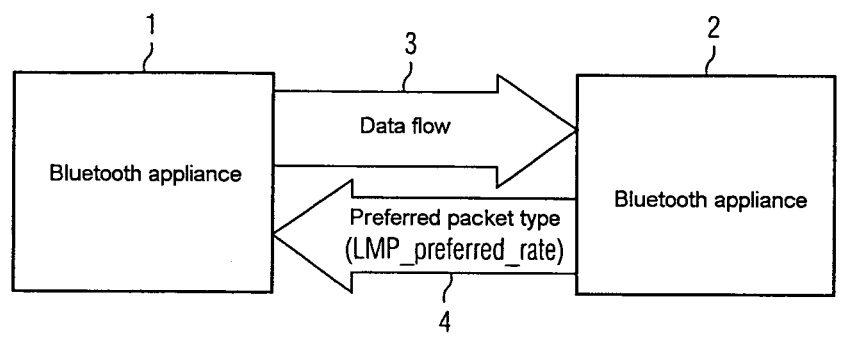
FIG. 1 shows an illustration of the basic principle of CQDDR (channel quality driven data rate change)

FIG. 1 shows the basic principle of CQDDR (channel quality driven data rate change) for a Bluetooth radio link. In this case, as the transmitter, a Bluetooth appliance 1 transmits data 3 to a Bluetooth appliance 2 that is currently operating as a receiver. The Bluetooth appliance 2 that is operating as a receiver sends a signal 4, which indicates the preferred packet type, in a back-channel to the Bluetooth appliance 1.

The essence of the CQDDR method is the receiving-end selection of the suitable packet type on the basis of the quality of the received data 3 for a present packet type. The selection that is made in the receiver is signalled to the transmitter 1 via the Bluetooth-specific signal LMP_preferred_rate.

Figure 2:
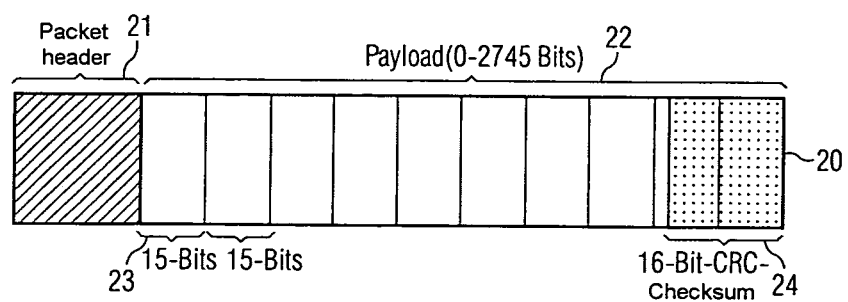
FIG. 2 shows an illustration of a Bluetooth packet.

FIG. 2 shows the illustration of the Bluetooth packet format based on the BLUETOOTH SPECIFICATION Version 1.1. A packet 20 is subdivided into a packet header 21 and the so-called payload or payload information 22. The payload may in this case have a length of between 0 and 2745 bits. In the case of DM packets, this is subdivided into blocks 23 of 15 bits each. In addition, the payload 22 contains a so-called 16-bit CRC checksum 24 (CRC—cyclic redundancy check).

As already stated in the introduction to the description, the packet types for asynchronous transmission are subdivided into DH packet types, which have only a packet error checksum, and DM packet types, with additional error protection by means of an FEC code.

The blocks shown in FIG. 2, which each have 15 bits, in this case correspond to the FEC error protection mechanism of the DM packet types. In this case, each of these blocks is coded using a so-called (15, 10) Hamming code. In a corresponding manner, 5 bits of redundancy are added in each block of 10 bits of uncoded information, thus resulting in a coded block of 15 bits being formed. The coding rate for this code is 2/3, and is defined as the ratio between the number of uncoded information bits and the number of bits in the coded sequence. Coding such as this allows error correction of all individual errors, as well as error identification of all double errors in a block. When DH packets are transmitted, no FEC coding is carried out on the basis of blocks of 15 bits each. The DH packets each have only the 16-bit CRC checksum 24 at the end of the transmitted packet 20, from which the integrity of the received packet can be deduced as an entity at the receiving end. No error correction is therefore possible in the receiver. The 16-bit CRC checksum 24 is also used in DM packets, as well. In this case, the checksum 24 is coded in precisely the same way as the rest of payload, using the (15, 10 Hamming code).

As already stated, the CQDDR-based packet type optimization is carried out with the aim of optimizing the effective data throughput. In order to optimize the effective data throughput, it is important to keep the number of transmission repetitions resulting from non-confirmed packets, that is to say from packets containing errors, as low as possible. This can be done by determining the packet error rate that can be determined on the basis of the check of the 16-bit CRC checksum. The packet error rate is measured by determining the number of packets with a CRC checksum that does not match the payload (in the case of DM packets, after the individual bit error correction). The packet error rate is then obtained as the quotient of this variable divided by the total number of packets received during the measurement period. A maximum of 800 data packets can be transmitted per second in a Bluetooth transmission system. This is dependent on the use of packet types that occupy only one time slot. This scenario occurs only rarely in reality. Typically, when there is a large amount of data, packets which cover 3 or 5 time slots are used, in which case the maximum number of received data packets is only 400 or 266 packets per second, respectively. This is precisely the number of measurement points per second that a measurement algorithm has in order to determine the packet error rate. However, this number is relatively small, in order to make a reliable statement on the packet error rate. The individual measurement results for the packet error rate could be subject to considerable scatter and could lead to an unstable control algorithm for the CQDDR method. This is remedied, while the packet error rate is used exclusively, by lengthening the measurement period, although this leads to a control loop with considerable inertia. This has the tendency to lead to instability in the control loop, and, furthermore, there is a delay in the reaction to changes to environmental conditions.

The exemplary embodiment of the method according to the invention uses the bit error rate based on the evaluation of the FEC decoding as the quality measure for DM packet types; the packet error rate is determined only for DH packet types. In comparison to the determination of the packet error rate, considerably more measurement points per unit time are available for determination of the bit error rate. The packet utilization level is also taken into account in this case.

FIG. 3 shows the flowchart for the method according to the invention for selection of the suitable packet type when using a DM packet type. A bit error rate BER 6 is determined in a first step 5. In addition, a packet utilization level 8 is determined in a second step 7. In a step 9, following this, discrete threshold values of the bit error rate 10, which are associated with the packet utilization level 8, are called up from a memory as a function of the packet utilization level 8. Interpolated BER threshold values 12 are then determined from the discrete threshold values with the aid of a subsequent optional interpolation process 11, with an upper threshold value being denoted $BER_{o\text{-}int}$, and a lower threshold value being denoted $BER_{u\text{-}int}$. The bit error rate 6 determined in the first step 5 is compared in a comparison operation 13 with the interpolated BER threshold values 12. A preferred packet type 16 is determined in a selection step 15, as a function of the comparison result 14. In a step 17 following this, the Bluetooth-specific selection signal LMP_preferred_rate 18 is generated from this information at the receiver end, and is transmitted to a Bluetooth appliance which is acting as a transmitter. This results in a change 19 at the transmission end to the preferred packet type.

The bit error rate 5 is determined by counting the individual errors and double errors in a number of 15-bit blocks. The bit error rate is in this case obtained as the quotient of the number N of bit errors divided by the total number of bits checked. At least 10 errors must be identified during this process in order to generate a reliable statement on the bit error rate. In this case, the greater the number of errors that have been identified, the more reliable is the statement on the bit error rate.

With regard to the determination of the packet utilization level 7, the packet utilization level 8 is obtained from the ratio of the actual number of bits in the payload to a maximum number of bits (which is dependent on the packet type) in the payload of one or more packets. The actual number of bits should in this case be regarded as information bits plus the redundancy. With regard to the maximum possible number of bits in the payload, the Bluetooth Standard allows a maximum of 2745 bits in each packet. However, this number represents only an upper limit for the maximum possible number of bits in a packet, which can be achieved in the case of packet types with 5 time slots. Packet types with 1 or 3 time slots have a correspondingly smaller maximum possible number of bits in the payload. When considering two or more packets, the packet utilization level represents a mean value variable.

BER threshold values 10 for a packet utilization level greater than the determined packet utilization level 8 and for a different packet utilization level less than the determined packet utilization level are read on the basis of the determined exact packet utilization level 8. In the exemplary embodiment, discrete threshold values 10 are stored in a memory for discrete packet utilization levels of 0.25 or 25%, 0.50 or 50%, 0.75 or 75%, and 1.00 or 100%. If, by way of example, a packet utilization level of 37% has been determined in the method according to the invention, then two threshold values (an upper and a lower threshold value) with a packet utilization level of 25% and two threshold values with a packet utilization level of 50% are read from the memory, from which an upper threshold value $BER_{o\text{-}int}$ and a lower threshold value $BER_{u\text{-}int}$ for a packet utilization level of 37% can be determined by linear interpolation 11. For the interpolated threshold values: $BER_{u\text{-}int} < BER_{o\text{-}int}$.

The interpolated threshold values 12 are used in addition to the bit error rate 6 as an input variable for the comparison operation 13, from which the subsequent selection operation 15 results in the preferred packet type 16. If the determined bit error rate 6 is greater than the upper threshold value $BER_{o\text{-}int}$, then that packet type with the next smaller amount of effective information in comparison to the present packet type is selected as the preferred packet type 16. If, in contrast, the determined bit error rate 6 is lower than the lower threshold value $BER_{u\text{-}int}$, then that packet type with the next greater amount of effective information in comparison to the present packet type is selected as the preferred packet type 16. Otherwise, the preferred packet type corresponds to the present packet type at that time; thus, in this case, there is no need to change the packet type. In this case, a packet type with a smaller amount of effective information has a shorter time duration—for example the packet type DM1 in comparison to the packet type DM3—or a lower coding rate—for example the packet type DM5 in comparison to the uncoded packet type DH5.

The packet type 16 determined in this way is transmitted as a Bluetooth-specific parameter LMP_preferred_rate 18 to the transmitter that, if necessary, carries out an appropriate switching process 19.

It is not possible to measure the bit error rate for DH packet types using FEC decoding, since these packet types have no FEC coding. In principle, a statement about the current bit error rate can be made even in the case of these packet types on the basis of the packet header information, since the packet header also has a CRC checksum. Owing to the small number of bits in the packet header and the statistical inaccuracy associated with this, of the bit error rate determined in this way, the packet error rate is determined directly for a given DH packet type. The method is in this case analogous to the procedure illustrated in FIG. 3.

The tables in FIG. 4a, FIG. 4b, FIG. 4c and FIG. 4d show the corresponding threshold values for the discrete packet utilization levels of 100%, 75%, 50% and 25%, respectively, which, in the case of the exemplary embodiment, are stored in the memory. If the interpolation is ignored, then a change to a packet type with a next smaller amount of effective information for a measured bit error rate or packet error rate is made which is less than the threshold values for the bit error rate (BER) or packet error rate (PER) indicated on the left in the tables. Conversely, a change is made to a packet type with the next higher amount of effective information in the event of a measured bit error rate or packet error rate which is greater than the threshold values of the bit error rate (BER) or packet error rate (PER) indicated on the right in the tables. In this case, the sequence for the amount of information is as follows (amount of information becoming greater): DM1, DM3, DM5, DH5. In general, for the embodiment of the method according to the invention, only one change is possible from a DM packet type to the DH5 packet type with 5 time slots. No change is possible from a DM5 packet type to a DH1 or DH3 packet type.

On the basis of the stated threshold values, which have been determined in the present example via a computer optimization process, it is possible to see that the mutually corresponding threshold values of the bit error rate increase as the packet utilization level becomes lower (see BER_$2_{100\%}=3.6 \cdot 10^{-3}$ from FIG. 4a to BER_$2_{25\%}=7.4 \cdot 10^{-3}$ from FIG. 4d). This is because the probability of a packet error being present decreases as the packet utilization level becomes lower, for the same bit error rate. Conversely, however, a higher bit error rate can also be tolerated for a lower packet utilization level, with the aim of achieving a specific packet error rate. Furthermore, as the amount of effective information in the present packet type becomes smaller, the threshold values for the bit error rate increase (see BER_$1_{100\%}=1.5 \cdot 10^{-4}$ to BER_$3_{100\%}=1.0 \cdot 10^{-2}$). The explanation of this is analogous, since a smaller amount of effective information is comparable to a lower packet utilization level. In both cases, the number of bits carrying information in each packet decreases.

The drifting of transmission-critical parameters, which has already been mentioned, can be used a further reason to explain the distribution of the threshold values. The probability of an error burst and, associated with this, of a packet being transmitted with errors (the FEC algorithm can correct only individual errors within a 15-bit block) increases as the packet length increases. It cannot be assumed that the bit error rate, as an averaged variable, over the duration of a packet, for example, adequately reflects the increase in the error burst probability at the end of the packet, since, as an absolute variable, the bit error rate contains no information about the distribution of the bit errors. In order to counteract this effect, it appears to be worthwhile reducing the threshold values for the bit error rate for long packet lengths or high packet utilization levels in comparison to the threshold values for short packet lengths or low packet utilization levels.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for optimization of the effective data throughput in a packet-oriented mobile radio transmission system with different packet types, comprising:
   a) receiving data comprising a present packet type;
   b) determining a value for at least one variable that is characteristic of an integrity of the received data in a single packet, or in two or more packets, or in a part of one or more packets for the present packet type by counting individual errors and double errors in a number of data blocks and dividing a quotient of the number of errors by a total number of data checked;
   c) determining a value for a packet utilization level for one or more packets of the present packet type, with the packet utilization level indicating, a ratio of an actual number of bits of payload information plus redundancy that is transmitted to a maximum possible number of bits, which is dependent on the packet type, of payload information in one or more packets, wherein the packet utilization level comprises a variable value for a given packet type;
   d) comparing the determined value for the at least one variable that is characteristic of the integrity of the received data with at least one interpolated threshold value that is dependent on the packet utilization level; and
   e) selecting a suitable packet type for a subsequent packet transmission in response to the comparison as a function of the at least one variable that is characteristic of the integrity of the received data, and of the packet utilization level.

2. The method according to claim 1, wherein the variable that is characteristic of the integrity of the received data comprises a bit error rate.

3. The method according to claim 2, wherein the packet types of the received data are coded using a forward error correction code.

4. The method according to claim 2, wherein two or more discrete packet utilization levels are associated with one or more respective threshold values, and the threshold values are stored in the mobile radio transmission system.

5. The method according to claim 4, wherein a threshold value is determined for a determined packet utilization level by interpolation from two or more stored threshold values.

6. The method according to claim 1, wherein the threshold value in act e) is dependent on the present packet type.

7. The method according to claim 6, wherein each of the packet types comprises one or more respectively associated threshold values, and the threshold values are stored in the mobile radio transmission system.

8. The method according to claim 2, wherein the bit error rate is compared in act e) with a first and a second threshold value, with the first threshold value being higher than the second threshold value.

9. The method according to claim 8, wherein the selection process in act e) further comprises:
   selecting a packet type with a next smaller amount of effective information than the present packet type if the bit error rate is higher than the first threshold value; and
   selecting a packet type with a next larger amount of effective information than the present packet type if the bit error rate is lower than the second threshold value.

10. The method according to claim 9, wherein a packet type with a smaller amount of effective information comprises a packet comprising a shorter time duration, or a lower coding rate, or both, than the present packet type.

11. The method according to claim 1, wherein the acts a) to e) are carried out in a receiver, and the act e) is followed by an additional act comprising:
   f) transmitting the selection of the suitable packet type to a transmitter that is associated with the receiver, and performing transmission-end switching of the packet type to the packet type selected in act e) at the transmitter.

12. The method according to claim 1, wherein the method is used in a Bluetooth radio transmission system.

13. A method for optimization of data throughput in a packet-type wireless transmission system, comprising:
   receiving data comprising a present packet type at a receiver;
   determining an integrity characteristic associated with the received data in a single packet, or in two or more packets, or in a part of one or more packets for the present packet type by counting individual errors and double errors in a number of data blocks and dividing a quotient of the number of errors by a total number of data checked;
   determining a packet utilization level associated with the received data, with the packet utilization level indicating a ratio of an actual number of bits of payload information plus redundancy that is transmitted to a maximum possible number of bits, which is dependent on the packet type, of payload information in one or more packets, wherein the packet utilization level comprises a variable value for a given packet type;

comparing the determined value for the at least one variable that is characteristic of the integrity of the received data with at least one interpolated threshold value that is dependent on the packet utilization level; and determining an optimal packet type for a subsequent packet transmission in response to the comparison based on the determined integrity characteristic and the packet utilization level.

14. The method of claim 13, wherein the present packet type comprises a DH type packet comprising a packet error checksum, and wherein the integrity characteristic comprises a packet error rate.

15. The method of claim 13, wherein the present packet type comprises a DM type packet comprising forward error correction coding, and wherein the integrity characteristic comprises a bit error rate.

16. The method of claim 15, wherein determining the optimal packet type comprises:

selecting bit error rate threshold values based on the determined packet utilization level;

comparing the determined bit error rate to the bit error rate threshold values; and determining the optimal packet type in response to the comparison.

17. The method of claim 16, further comprising:

calculating interpolated bit error rate threshold values based on the bit error rate threshold values, and using the interpolated bit error rate threshold values in the comparison.

18. The method of claim 13, further comprising:

communicating the optimal packet type to a transmitter performing the subsequent packet transmission; and performing a switch of packet types for transmission, if necessary, based on the communication.

* * * * *